March 20, 1951 C. L. EKSERGIAN 2,545,943
VARIABLE TREAD WHEEL

Filed Dec. 4, 1945 2 Sheets—Sheet 1

INVENTOR
Carolus L. Eksergian
BY
ATTORNEY

March 20, 1951     C. L. EKSERGIAN     2,545,943

VARIABLE TREAD WHEEL

Filed Dec. 4, 1945     2 Sheets-Sheet 2

INVENTOR
Carolus L. Eksergian
BY
ATTORNEY

Patented Mar. 20, 1951

2,545,943

UNITED STATES PATENT OFFICE 2,545,943

VARIABLE TREAD WHEEL

Carolus L. Eksergian, Detroit, Mich., assignor to The Budd Company, Philadelphia, Pa., a corporation of Pennsylvania Application December 4, 1945, Serial No. 632,655

4 Claims. (Cl. 301—11)

The invention relates to wheels, and particularly to wheels providing a variable tread, for use in agricultural vehicles or the like.

It is a particular object of the invention to provide a simplified arrangement for securing the wheel body to the rim and one which facilitates the mounting of the rim at either side of the wheel body and by the same securing means.

It is a further object to provide a simplified attaching lug for the rim, and through the use of which weight and costs are reduced and the wheel body may be seated and secured at either axial side of the lug with equal facility.

Other and further objects and advantages will appear from the following detailed description when read in connection with the accompanying drawings forming a part of this specification.

Figure 1:
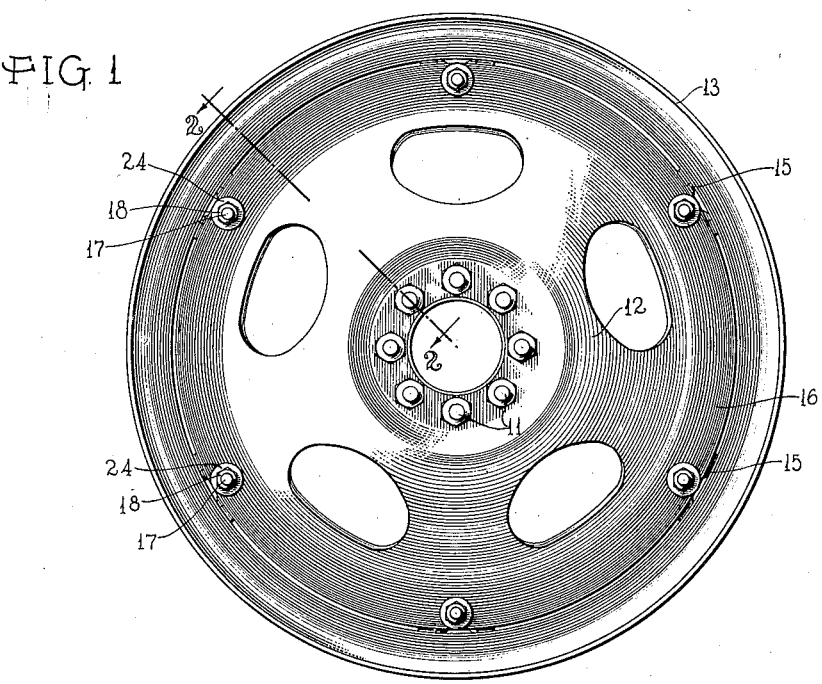
Fig. 1 is an outboard face view of a wheel according to the invention.

In the drawings, there is shown a wheel organization comprising a usual hub having a radial bolting-on flange 10 to which is demountably secured, as by an annular series of bolts 11, a reversible disc wheel body 12 which is shown of a usual tapered and dished form. By simply reversing the wheel body on the hub flange two different tread widths are obtained.

Provision is made for further variation in tread width according to the invention, by the manner in which the rim 13 is secured to the wheel body.

The rim 13 may be a continuous annular rim of the drop center type and at equally spaced points of its periphery and to one side of the central plane of the rim are secured, as by rivets 14, a series of axially widened attaching lugs 15 to which the radially extending peripheral portion 16 of the disc wheel body is secured by securing means such as the bolts 17 and nuts 18.

Figure 5:
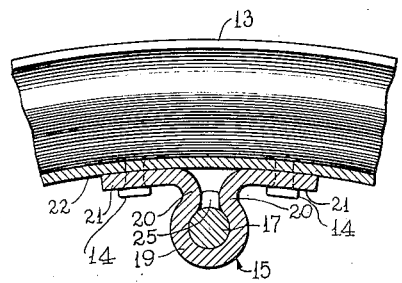
Fig. 5 is a fragmentary sectional view taken substantially on the line 5—5 of Fig. 3.
Figure 4:
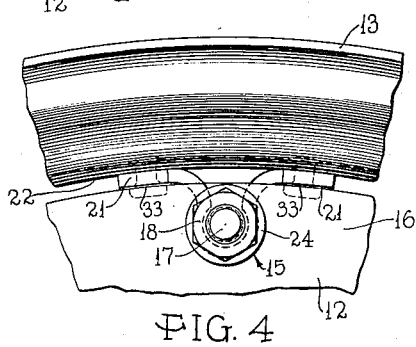
Fig. 4 is a fragmentary elevational view, on the scale of Fig. 3, of the region adjacent an attaching lug.

Each lug 15 may be made from a metal strip bent to form a central looped or ferrule-like portion 19 which surrounds the bolt 17 associated therewith for somewhat more than 180° of its circumference and loosely receives the bolt. From this central looped or ferrule-like portion the strip is extended through generally radially extending spaced portions 20, 20 to the rim, see Fig. 5, and its end portions 21, 21 are formed to seat against the inner face of the rim base 22 and are secured thereto by the rivets 14.

Figure 2:
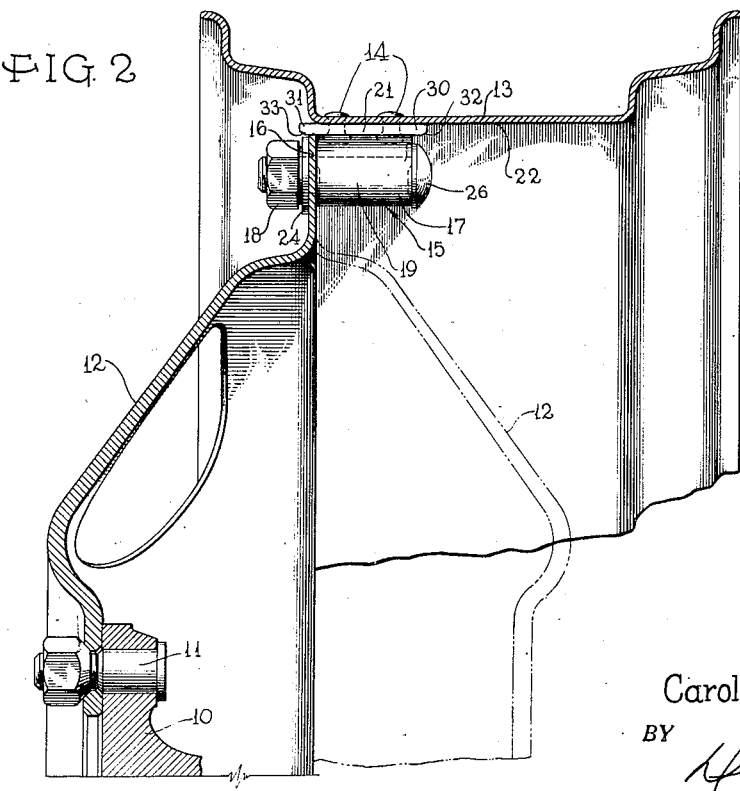
Fig. 2 is an enlarged fragmentary sectional view of the wheel shown in Fig. 1, one position of the wheel body being shown in full lines and another in dot-and-dash lines and the section being taken substantially along the line 2—2 of Fig. 1.
Figure 7:
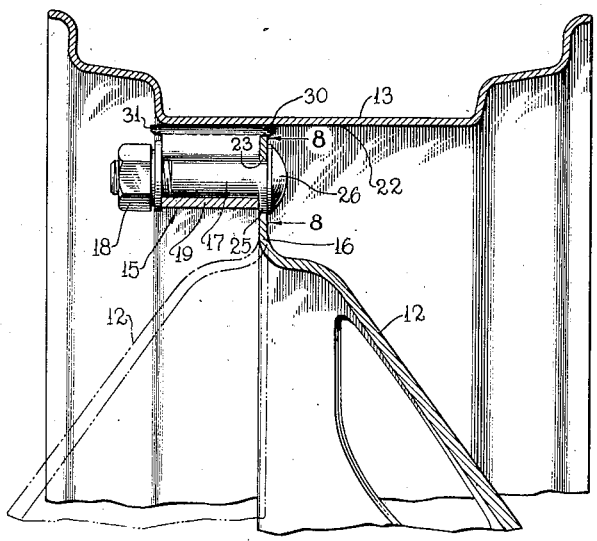
Fig. 7 is a fragmentary sectional view, similar to Fig. 2, but taken through an attaching lug as in Fig. 3, and showing the full line and dot-and-dash line of positions of the wheel body when attached to the inboard faces of the attaching lugs.
Figure 6:
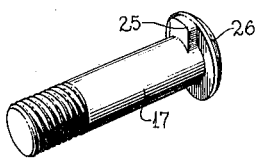
Fig. 6 is a detail perspective view of an attaching bolt.

Preferably, to facilitate the mounting of the rim in four different positions on the wheel body periphery, two of which are indicated in Fig. 2, and two more in Fig. 7, the axially outer and inner ends of the ferrule-like or looped central portion 19 of each lug 15 provide flat radially extending mounting faces and the mounting faces of all the lugs for each of the axial ends thereof are in the same plane.

The outer peripheral portion of the disc wheel body is formed with holes 23 corresponding in number and location to the number and location of the lugs 15 so that when the disc is seated against either the axially outer or the axially inner radial faces of the lugs, it may be firmly secured in place by passing the bolts 17 through the aligned openings, respectively, in the wheel body and the ferrule-like central portions 19 of the lugs, and tightening the nuts 18 screwed onto the bolts. A suitable lock washer, as 24, may be provided to prevent loosening of the nuts.

The open-looped or ferrule-like central portion 19 of each lug provides means, the generally radially extending spaced portions 20, 20, ready at hand for locking the bolt 17 against turning. Cooperating with these spaced portions 20, 20 is an axially thin projection or lug 25 extending laterally from the bolt just beneath the bolt head 26. When the wheel body is secured in the position shown in Figs. 2 to 5, this lug 25 enters the space between portions 20, 20 and prevents turning of the bolt, see Fig. 5.

Figure 8:
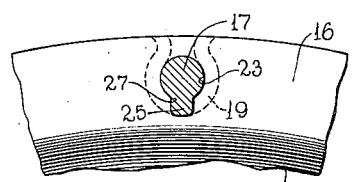
Fig. 8 is a detail sectional view taken substantially along the line 8—8 of Fig. 7.

To enable the bolts to be tightened up from the outboard side of the wheel, when the wheel is seated against the axially inboard faces of the lugs 15, as shown in Fig. 7, the holes 23 in the disc are each formed with a radially inward eccentric extension 27 of the shape of the extension 25 on the bolt and adapted to receive this extension and prevent the rotation of the bolt when the wheel is secured in the positions shown in this figure and in the section of Fig. 8.

Figure 3:
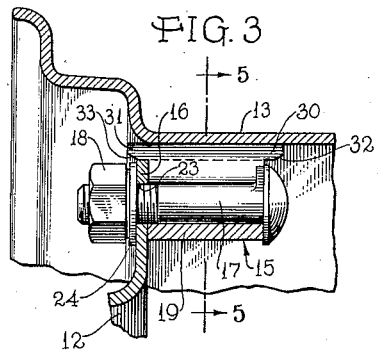
Fig. 3 is an enlarged fragmentary sectional view through a rim attaching lug.

To facilitate the change from the relative disc and rim positions shown in Fig. 2 to those of Fig. 7 or vice versa, the outer diameter of the disc body 12 is preferably made somewhat smaller than the inner diameter of the rim 13 and to provide a firm axial seating of the rim on the disc body each lug has its end portions 21, 21 preferably extended axially inwardly and outwardly of the respective inboard and outboard radial seating faces on the looped central portion 19 of the lug. These extensions, designated respectively, 30 and 31, see Figs. 2, 3 and 7, provide axial seats against which the outer periphery of the disc firmly engages to carry the radial loads without placing severe loading strains on the bolts and nuts 17, 18.

To insure a firm seating and to take care of manufacturing tolerances, the extensions 30 and 31 beyond their axial seats for engagement with the disc periphery are formed with inclined faces 32 and 33, respectively, over which the disc may be axially forced to its normal assembled position engaging with its periphery the axial seat adjoining the radial seat therefor at that end of the lug 15.

While in the preferred form described, the rim is firmly seated and centered on the disc body through the engagement of the seats on axial extensions 30 and 31 on the lugs 15 with the periphery of the disc, such seating may in some cases be dispensed with and the clamping action of the bolts and nuts relied on to press the disc body with sufficient friction against the radial seats at the end of the central looped portions 19 of the lugs to carry the radial loads. By accurately machining the holes in the disc body and lugs so as to fit the bolts, the bolts themselves may be used to center the rim on the disc without any peripheral edge engagement between the disc and the rim.

From the foregoing description, it will be seen that a very simple mounting between the disc and rim of a variable tread wheel has been provided. With this construction by mounting the disc at axially opposite sides of the lugs on the rim and by reversing the rim, four different tread widths may be readily attained, and this by the use of a single set of securing bolts accessible for releasing and securing from the outboard side of the wheel. Since the wheel body itself is preferably reversible on the hub, as shown, eight different tread widths are thus made easily available, the various positions of adjustment of the tread depending, on the one hand, on the axial width or thickness of the lugs 15 and, on the other hand, on the degree of lateral offset of the peripheral portion of the disc from its hub securement plane.

While a specific embodiment of the invention has been hereinbefore described, it will be understood that changes and modifications may be made by those skilled in this art without departing from the main features of the invention and such changes and modifications are intended to be covered in the appended claims.

What is claimed is:

1. In combination, a disc wheel body having a radially extending peripheral portion provided with spaced securing holes, an annularly continuous rim and spaced attaching lugs corresponding in number and spacing to said holes and secured to the radially inner face of the rim, each of said lugs comprising a metal strip having its central portion bent to form a ferrule-like portion radially spaced inwardly from the rim for receiving an attaching bolt and having radially extending outer and inner seats for receiving the wheel body thereagainst, said strip having end portions bent away from said central portion and seated on and secured to the rim, the end portions being widened to extend axially a material distance beyond said central portion and thereby provide, at each axial end of the lug, seating portions having inclined entering faces for engagement alternately with the periphery of the wheel body, and a clamping bolt extending through the central ferrule-like portion of each lug and the corresponding hole in the wheel body peripheral portion for securing the wheel body alternately to either radially extending seat of the lug with its periphery in engagement with the respective axially extending seating portions on the lug.

2. In combination, a disc wheel body having a radially extending peripheral portion provided with spaced securing holes, an annularly continuous rim and spaced attaching lugs corresponding in number and spacing to said holes and secured to the radially inner face of said rim, each of said lugs having a central axially-extending ferrule-like portion radially spaced inwardly from said rim for receiving a securing bolt therethrough and substantially flat end portions extending from said central portion and seated on and secured to the rim, each lug further having at each axial end thereof a radial seat and an axial seat for receiving the peripheral portion of the wheel body alternately, said axial seats being formed by extending the flat end portions axially a material distance beyond the adjacent radial seats, and a clamping bolt extending through the central ferrule-like portion of the lug and the corresponding hole in the wheel body peripheral portion for alternately clamping the wheel body to the radial and axial seats at either axial end of said lug.

3. In combination, a disc wheel body having a radially extending peripheral portion provided with spaced securing holes, an annularly continuous rim and spaced attaching lugs corresponding in number and spacing to said holes and secured to the radially inner face of the rim, each of said lugs having a central axially-extending looped portion forming a hole for a securing bolt and merging through spaced generally radially extending portions with end portions seated on and secured to the rim, and a securing bolt extending through the hole in the looped portion of the lug and the corresponding hole in the wheel body peripheral portion to clamp the wheel body to the rim, said bolt having a lateral projection entering between said spaced generally radially extending portions of the lug to prevent turning of the bolt when the wheel body is clamped to one end of the lug.

4. In combination, a disc wheel body having a radially extending peripheral portion provided with spaced securing holes each having a lateral eccentric extension, an annularly continuous rim and spaced attaching lugs corresponding in number and spacing to said holes and secured to the radially inner face of said rim, each of said lugs having a central axially extending looped portion forming a hole for receiving a securing bolt and merging through spaced generally radially extending portions with end portions seated on and secured to the rim, the axially extending looped portion having radial seats at its opposite ends to alternately receive the wheel body peripheral portion, and a securing bolt extending through the hole in said looped portion of the lug and the corresponding hole in the wheel body peripheral portion for clamping said wheel body portion alternately to either of said radial seats, the bolt having a lateral projection entering, in one of the alternate positions of the wheel body portion, between said spaced radially extending portions of the lug and, in the other of said alternate positions of the wheel body portion, into the lateral eccentric extension of the adjacent hole of the wheel body portion, whereby to prevent, in either alternate position of said wheel body portion, turning of the bolt when the said body portion is clamped in place.

CAROLUS L. EKSERGIAN.

REFERENCES CITED

The following references are of record in the file of this patent:

UNITED STATES PATENTS

| Number | Name | Date |
| --- | --- | --- |
| 1,570,645 | Roche | Jan. 26, 1926 |
| 1,964,770 | Runge | July 3, 1934 |
| 2,242,425 | Ferro | May 20, 1941 |
| 2,243,380 | Kinney | May 27, 1941 |
| 2,294,256 | Uber | Aug. 25, 1942 |